No. 637,469. Patented Nov. 21, 1899.
O. LAVANCHY.
TIRE FOR CYCLE OR OTHER WHEELS.
(Application filed Feb. 1, 1899.)
(No Model.) 2 Sheets—Sheet 1.
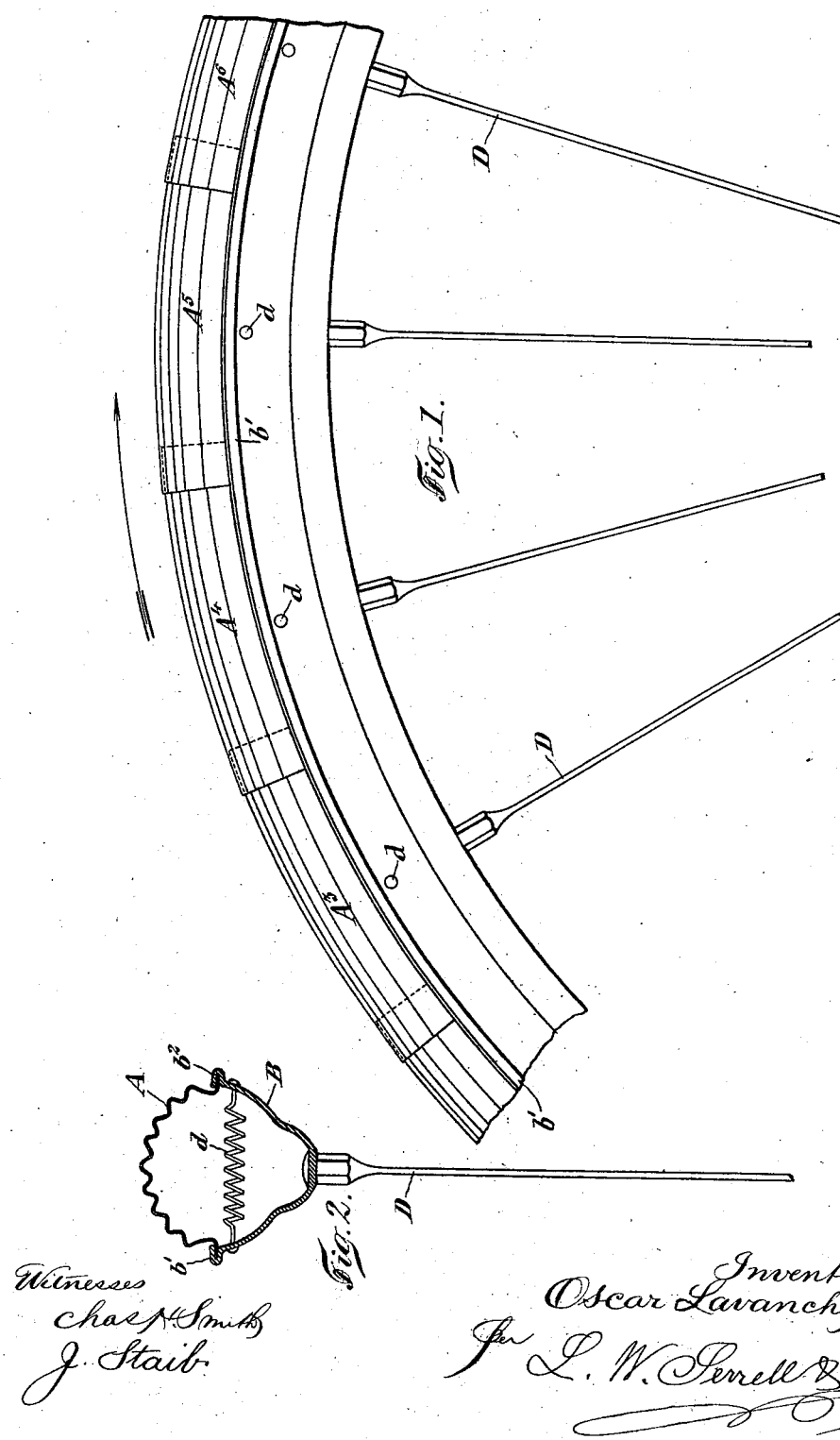
Witnesses
Chas H Smith
J. Staib
Inventor
Oscar Lavanchy
per L. W. Serrell & Son
Attys No. 637,469. Patented Nov. 21, 1899.
O. LAVANCHY.
TIRE FOR CYCLE OR OTHER WHEELS.
(Application filed Feb. 1, 1899.)
(No Model.) 2 Sheets—Sheet 2.
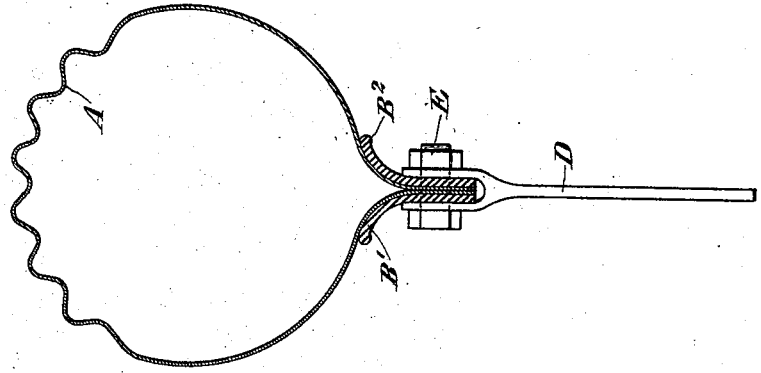
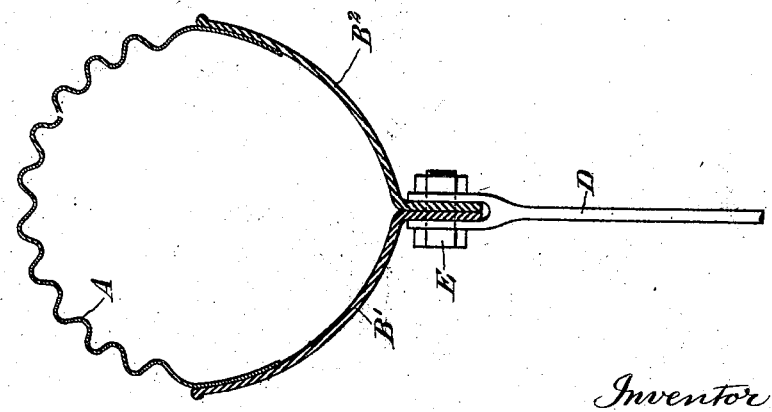
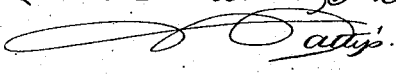

UNITED STATES PATENT OFFICE.

OSCAR LAVANCHY, OF VEVEY, SWITZERLAND.

TIRE FOR CYCLES OR OTHER WHEELS.

SPECIFICATION forming part of Letters Patent No. 637,469, dated November 21, 1899.

Application filed February 1, 1899. Serial No. 704,080. (No model.)

*To all whom it may concern:*

Be it known that I, OSCAR LAVANCHY, merchant, of Vevey, Switzerland, have invented certain new and useful Improvements in Tires for Cycles or other Wheels, of which the following is a specification.

This invention relates to improvements in tires for cycles or other wheels intended to replace the well-known pneumatic tires, which are very rapidly worn out.

The chief object of my invention is to replace the combined air-tube and jacket inclosing the same of the pneumatic tires at present constructed by a flexible metallic tire presenting approximately the same advantages as those pneumatic tires with respect to their elasticity and being much more durable, being not exposed to wear and abrasion and moisture and other deleterious influences to which the pneumatic tires are exposed.

In my improvement the flexible metallic tire is fluted in cross-section and thus formed with circumferential ribs.

In the accompanying drawings, Figure 1 is a side elevation, and Fig. 2 a cross-section, representing my invention; and Figs. 3 and 4 are cross-sections of two modifications of the flexible metallic tire.

In all the figures the same letters of reference refer to the same parts.

In the construction Figs. 1 and 2 the wheel-rim B is provided with suitably-folded edges $b'$ and $b^2$, forming two circular grooves, in which are engaged the edges of a flexible fluted steel band A, made of several sections $A^3$ $A^4$ $A^5$, &c., which are arranged to overlap one another, as shown in Fig. 1. D are the spokes which connect the wheel-rim B to the hub, which may be of any of the well-known constructions, and $d$ are springs or equivalent holding devices fixed across the rim B at suitable distances from one another, the object of which is to hold the rim to shape and prevent the rim spreading when the flexible steel bands are depressed and also to prevent the tendency of dislodging the edges $b'$ and $b^2$ of the rim B from one another.

In the modification Fig. 3 the flexible metallic tire is formed of a fluted circle A, of steel, of the fluted section shown and made of one piece all around the wheel. The steel wheel-rim is here formed of two flanged portions B' and $B^2$, which are connected with one another at the flanges by means of suitable screws or bolts E, placed at suitable intervals and fixed to the spokes D, which are suitably forked, as shown.

In the modification in Fig. 4 the tire A of fluted cross-section is formed as a tubular ring of sheet metal, the inner edges of which are brought together and connected to the forked spokes D by means of the two portions B' and $B^2$ of the rim by the screws or bolts E.

Having thus fully described my invention, I claim—

In a wheel, the combination with the spokes, of a rim having inwardly-turned-over edges and a flexible tire formed of spring sheet metal fluted in cross-section and having edges adapted to be received and held by the turned-over edges of the rim, and having transverse springs extending across the rim, substantially as set forth.

In testimony that I claim the foregoing as my invention I have signed my name in presence of two subscribing witnesses.

OSCAR LAVANCHY. [L. S.]

Witnesses:
E. SCHNEIDER,
E. FAVRE.